United States Patent
Eryou et al.

[11] Patent Number: 5,154,569
[45] Date of Patent: Oct. 13, 1992

[54] WHEELCHAIR LOADING DEVICE FOR AIRCRAFT

[75] Inventors: Douglas F. Eryou, Huntington, N.Y.; Norman D. Eryou, Winnipeg, Canada

[73] Assignee: 2535701 Manitoba Limited, Winnipeg, Canada

[21] Appl. No.: 525,193

[22] Filed: May 17, 1990

Related U.S. Application Data

[63] Continuation-in-part of Ser. No. 305,469, Feb. 1, 1989, abandoned.

[30] Foreign Application Priority Data

Oct. 17, 1989 [CA] Canada .................. 2000898

[51] Int. Cl.$^5$ .............................................. B66F 3/22
[52] U.S. Cl. .................................... 414/495; 182/141;
 187/8.59; 187/9 R; 414/921; 414/537; 414/476;
 244/137.2; 254/126; 14/71.3
[58] Field of Search ............... 414/495, 537, 921, 540,
 414/474, 476, 496, 497; 187/9 R, 8.59, 8.69;
 244/137.1, 137.2; 14/71.3, 72.5; 254/2 C, 7 B,
 126, 98; 182/141, 148, 64, 68, 69, 63, 127, 156

[56] References Cited

U.S. PATENT DOCUMENTS

| | | | |
|---|---|---|---|
| 2,55,223 | 10/1953 | Villars ........................ | 187/8.59 |
| 1,963,022 | 6/1934 | Kettelson ..................... | 187/8.59 |
| 3,153,544 | 10/1964 | Jung et al. ................... | 414/495 X |
| 3,524,563 | 8/1970 | McCartney et al. ............ | 414/495 X |
| 3,620,389 | 11/1971 | Munck ......................... | 414/282 |
| 3,806,092 | 4/1974 | Richards ...................... | 414/495 X |
| 3,820,631 | 6/1974 | King et al. ................... | 182/141 |
| 3,910,264 | 10/1975 | Mahieu ........................ | 187/141 X |
| 4,572,328 | 2/1986 | Benko ......................... | 182/141 X |
| 4,787,111 | 11/1988 | Pacek et al. .................. | 414/921 X |

FOREIGN PATENT DOCUMENTS

| | | | |
|---|---|---|---|
| 962632 | 2/1975 | Canada ........................ | 187/9 R |
| 1095462 | 2/1981 | Canada ........................ | 414/921 |
| 909560 | 3/1954 | Fed. Rep. of Germany ...... | 414/495 |
| 8202031 | 6/1982 | PCT Int'l Appl. ............. | 244/137.2 |
| 876241 | 8/1961 | United Kingdom ............. | 414/495 |
| 925227 | 5/1963 | United Kingdom ............. | 414/495 |

*Primary Examiner*—Frank E. Werner
*Attorney, Agent, or Firm*—Barrigar & Oyen

[57] ABSTRACT

This invention relates to a lift device adapted to transfer wheelchair passengers to commuter aircraft. A base and optional four post system provide support for a vertically moveable platform. An apron, which can be used either as a ramp from lowered platform to ground or a bridge from elevated platform to aircraft is provided. The platform is preferably raised and lowered using ball or acme screw-bushing brackets. The platform can be used to load and unload passengers from rear and front door commuter aircraft, on either side of the fuselage. The lift can be incorporated into a wheeled chassis, which can be lowered into ground contact at the position of use. Optionally extendible stairs are present to allow other passengers to enter or leave the aircraft using said platform and apron.

13 Claims, 6 Drawing Sheets

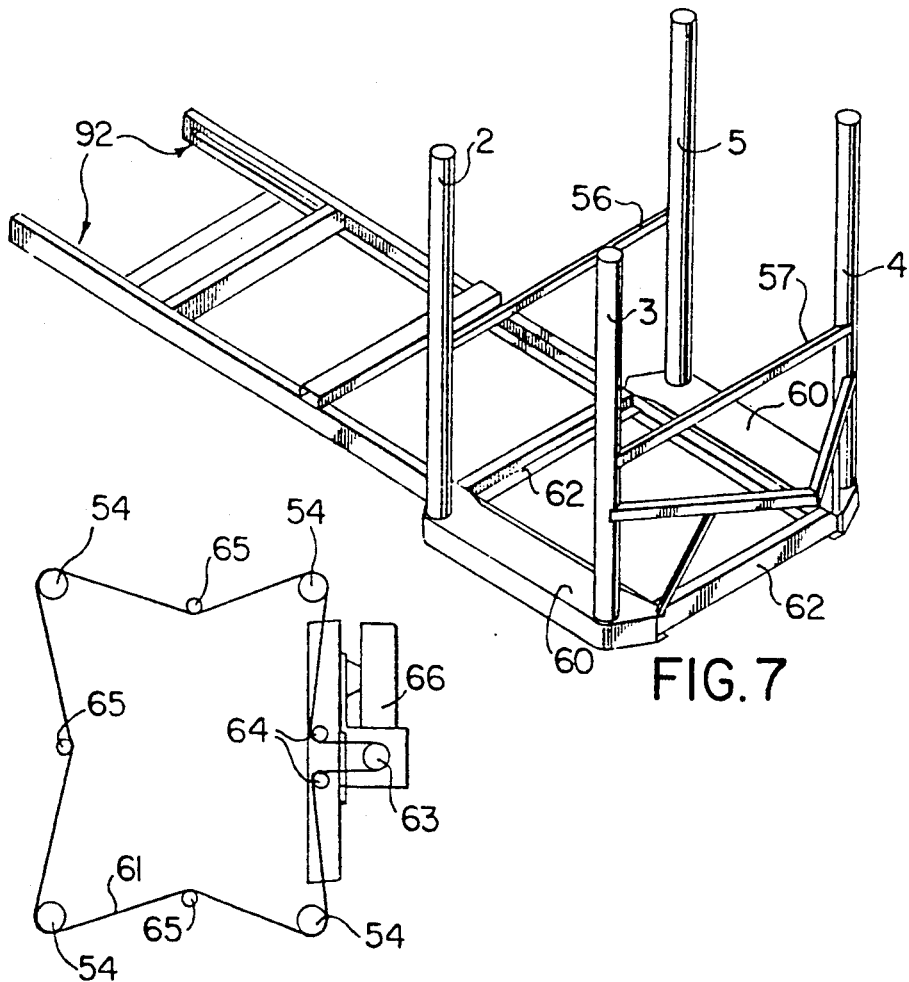
FIG. 7
FIG. 8
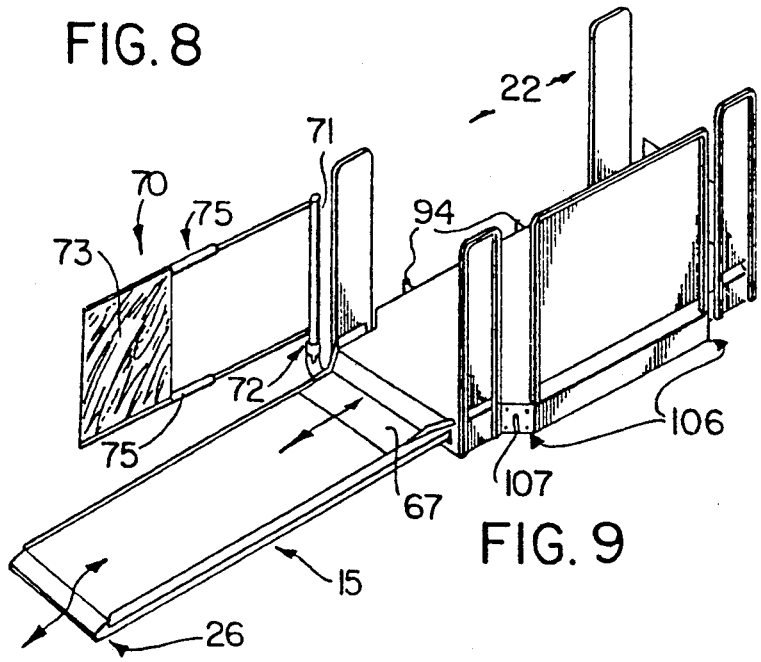
FIG. 9

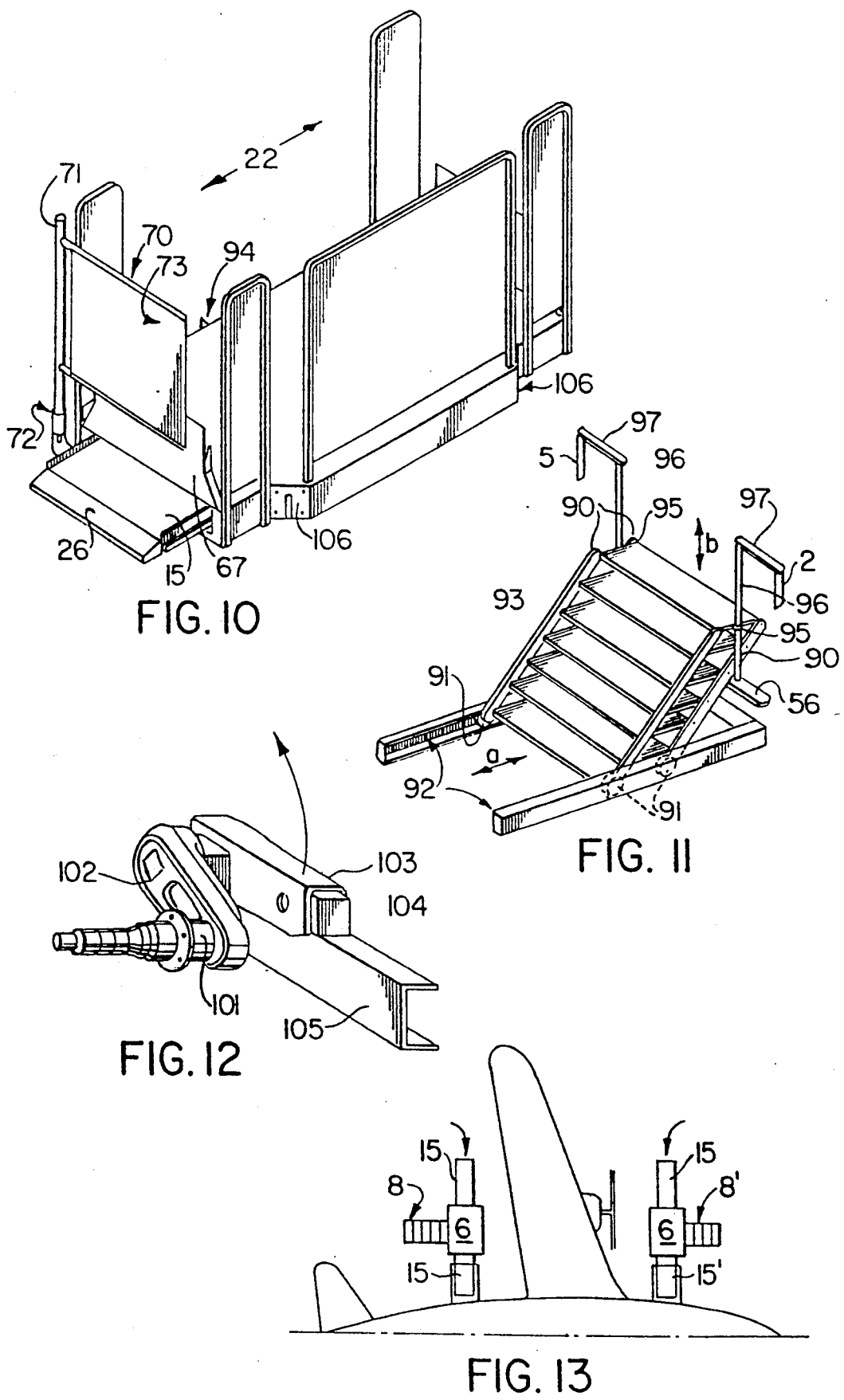

WHEELCHAIR LOADING DEVICE FOR AIRCRAFT

This application is a continuation-in-part of a parent application entitled Wheel Chair Loading Device for Aircraft, filed Feb. 1, 1989, and assigned Ser. No. 305,469, now abandoned.

This invention relates to devices for loading persons in wheelchairs into and out of passenger aircraft, preferably smaller so-called "commuter aircraft".

Certain handicapped people require aircraft boarding assistance at airports; usually wheelchairs are used to move such people around airports and into aircraft. There is no difficulty loading such people in wheelchairs into passenger aircraft at airports where permanent, level entry boarding ramps are available for passenger loading since a wheelchair and occupant can be simply wheeled along such a boarding ramp and into the aircraft. Difficulties arise at airports, especially smaller airports, handling aircraft, especially commuter aircraft, which have "airstairs" (steps built into an aircraft door) for loading passengers or require a movable flight of steps to service boarding needs. Neither of the foregoing accommodates the enplaning or deplaning of passengers in wheelchairs and, therefore, air travel of the handicapped is restricted or rendered difficult. Lifting and carrying handicapped passengers by hand onto and off of commuter aircraft is often required.

At present the United States Federal Aviation Administration guidelines require either the airport or the carrier, depending on responsibility, to provide boarding assistance for disabled people who request assistance. These guidelines require the airport or the carrier, where there are no level entry boarding ramps, to provide mechanical lifts, ramps, boarding chairs and personnel necessary to operate them.

There is an exception to this applying to aircraft with a passenger capacity of 19 or less, where physical limitations prevent the use of level entry boarding ramps, mechanical lifts and other feasible devices. Here the only presently available method is to load the disabled person by hand. However, carrier and airport personnel are not required to do this for reasons of safety and dignity.

Carriers and airports are required to use any feasible devices that are developed. Refusal of service could not be acceptable if a feasible device existed but was not available at a particular airport.

DISCUSSION OF PRIOR ART

A prerequisite for any wheelchair loading device for aircraft is height adjustability as the various aircraft in use today have differently designed doorsill heights which also vary according to aircraft load. Loading devices exist for handicapped persons in wheelchairs. O'Brien, in U.S. Pat. No. 3,888,463, issued Jun. 10, 1975, teaches a hoist operable by the wheelchair occupant, which consists of a self-levelling platform mounted on paired, hydraulically operated booms. The platform can move from a position level with the ground to an elevated position. A substantial disadvantage with this device is that the wheelchair has to move on and off in the same direction, i.e., either reverse on, forward off, or forward on, reverse off.

Koerber, in U.S. Pat. No. 4,493,602, issued Jan. 15, 1985, teaches a hoist built into a vehicle comprising a column in the vehicle mounting a hoist which can be vertically raised or lowered by a drive screw to a level just above the vehicle floor, and then horizontally swung about a pivot into the vehicle for loading or discharge. Integration of such a device into a commuter aircraft is undesirable for many reasons, especially cost. Also, desirably any wheelchair loading device would incorporate adjustable stair means for use by other passengers. Adjustable stairs are fairly well known in building construction but these are not adjustable when installed; the adjustable feature lies in their adaptability to fit a number of building situations and exemplary are U.S. Pat. No. 4,593,503 issued Jun. 10, 1986 to Koslowski, and U.S. Pat. No. 4,615,160 issued Oct. 7, 1986 to LeBlond. These patents disclose stairs both extendable in length and adjustable in angle of rise, while maintaining level (horizontal) treads. Mobile adjustable access stairs for aircraft are less common and those known allow no wheelchair access. See U.S. Des. Pat. No. 149,392 issued Apr. 20, 1948 to Varrieur, U.S. Pat. No. 2,551,345 issued May 1, 1955 to Scott, U.S. Des. Pat. No. 177,858 issued May 29, 1956 to Phelps, U.S. Pat. No. 2,812,528 issued Nov. 12, 1957 to Odell, and U.S. Pat. No. 3,910,264 issued Oct. 7, 1975 to Mahieu.

Thus, there is a need for a wheelchair loading device for aircraft, especially commuter aircraft, which conveniently, safely and with dignity provides for loading of passengers in wheelchairs. It would be most suitable, as well, if such a device could accommodate boarding of such aircraft by other, non-disabled passengers, both for the convenience of the other passengers and to provide for a disabled passenger a greater sense that he or she is not so different from other passengers. Disabled persons are striving generally for provision of support equipment and services that can also be used by non-disabled persons to put the former more into the mainstream of normal life.

SUMMARY OF THE INVENTION

The invention provides a lift comprising in combination a base, platform and means for vertically moving said platform with respect to said base between lower and upper levels, said platform comprising an apron adapted for loading and unloading persons in wheelchairs at said lower and upper levels. The apron may comprise either a drawbridge ramp or a retractable apron. Preferably the drawbridge ramp is attached to the platform by a piano hinge. In one version, first and second drawbridge ramps are hingeably attached to the platform; these first and second drawbridge ramps may be opposed, on opposing sides of the platform. In a less preferred form, the first and second drawbridge ramps are adjacent. In a most preferred form, the apron is a single apron slideably mounted beneath said platform, adapted for loading and unloading persons in wheelchairs at first and second opposed platform sides. The single apron may be operated manually or, most preferably, by electric means.

The lift of the invention may be placed against an aircraft side with the platform in a lowered position. In such position, a wheelchair and occupant are pushed up the apron onto the platform, the apron is raised or retracted, the platform is raised to a level suitable for the aircraft, the apron is lowered or extended to the aircraft door-sill, or airstair sill in a lowered aircraft door, and the wheelchair and occupant are pushed over the apron, all without rotating the wheelchair. Under certain circumstances it may be desirable to have one drawbridge ramp at right angles to another. As there is considerable variation in door-sill level due to aircraft type and loading, it is desirable to provide an equal variety of possible upper levels. In practice the desirable maximum upper level of the lift above a substrate is 65 inches (1.65 m), while the minimum upper level is 40 inches (1.02 m), to load/unload current commuter aircraft. To ensure matching possible door levels the platform can be held at any height within this range. In practice the apron as a drawbridge may be 19 inches (0.48 m) wide and 48 inches (1.22 m) long. As the platform must be lowered onto the base which can hardly be less than 4 inches (0.1 m) high, the drawbridge provides a reasonable ramp angle of 1:12 (4.78 degrees), within official guidelines. An extendible, sliding inner ramp within a hinged outer ramp (drawbridge) may be provided if a longer drawbridge, or drawbridge with variable extension part is desired. When the apron is a single, retractable apron mounted beneath the said platform, preferably it is about 6 feet long, 18 inches wide and operable to extend about 5 feet beyond either opposed end of the said platform.

Advantageously the base is mounted on a chassis having wheels, wherein the base conveniently forms the lowest part of the chassis. As the wheels are retracted, the base is lowered into ground contact. The retractable wheels therefore allow the lift device to be towed or pushed to the aircraft, and the base to be lowered into ground contact.

In another form, the invention is a lift comprising in combination a base, platform and means for vertically moving the platform with respect to the base means, the platform comprising an apron adapted for loading and unloading persons in wheelchairs at the lower and elevated levels, the means for vertically moving the platform with respect to the base means comprising support means attached to the platform, moveable means attached to each support means to move vertically the support means, the moveable means being mounted on the base, and an actuator to actuate each moveable means, drive mechanism to drive each actuator, the drive mechanism being synchronized, and mounted on the base.

The platform preferably has bracket means each comprising a bushing engaging a substantially vertical ball screw, which is rotatably journalled in upper and lower brackets attached to a substantially vertical upright means attached to the base, an actuator being attached to the base of the ball screw. The actuator is conveniently selected from the group consisting of a pulley adapted for V-belt drive, a sprocket wheel adapted for sprocket chain drive, a timing wheel adapted for timing belt drive, and a miter gear adapted for miter gear drive. The bushing is preferably a ball nut.

The platform most preferably has brackets comprising an acme screw rather than the said ball screw, and a bushing that is a nut. Further preferably the brackets include a rocker means on such nut for transferring weight of the platform vertically onto the nut notwithstanding non-vertical movements of the platform. Also preferably, the acme screw is mounted to receive loads in tension rather than compression, for instance by attachment at a top portion thereof to an upright support.

Preferably stairs are extendible between a first upper level of said platform and a second upper level of said platform, whereby persons on foot may use such lift as stair access. The stairs may be aligned at right-angles to the direction of extension of the said single apron. Also, when upright members are attached to the base, the said stairs may be attached between the upright members. The apron may comprise first, second and third drawbridge ramps, preferably attached by piano hinges to the platform, and may be extendible. Most preferably the apron is a single apron slideably mounted beneath said platform.

In another aspect, the invention is an improvement in a wheelchair lift having a platform, suitable for loading and unloading aircraft, the improvement comprising an apron adapted to load and unload persons in wheelchairs from said platform to aircraft, and an apron, preferably the same as the immediately aforesaid apron, adapted to load and unload persons in wheelchairs from platform to ground. The wheelchair lift may comprise a base mounted on a chassis having wheels. The base may form the lowest part of the chassis, and the wheels may be retractable, so the base may be lowered into ground contact.

The platform deck is preferably 32 inches (0.9 m) by 60 inches (1.2 m) to provide room for an occupied wheelchair and attendant.

The base preferably includes channels about 4 inches (0.1 m) high with internal flanges to accommodate the drive system. Preferably upright guides, which may be square or circular in cross-section and contain the moving means, are 3 inches (0.075 m) wide on each side if square, or in diameter if round, and 65 inches (1.65 m) high from ground to top. A commercially available ball screw or acme screw can be used in the operation of the invention.

As will be appreciated by those skilled in the art, the dimensions given above are for guidance only; they can be varied within acceptable limits without changing the structure or function of the lift.

SUMMARY OF THE DRAWINGS

Preferred embodiments of the invention are illustrated in the drawings in which:

FIG. 5b shows a side, cross-sectional view through the upright guide of FIG. 5a;

FIG. 7 shows a perspective view of the chassis and selected support members of the lift device of FIG. 1;

FIG. 8 shows an overhead plan view of a preferred drive mechanism for the lift platform of the lift device of FIG. 1;

FIG. 9 shows a perspective view of a preferred lift platform for a lift device according to the invention;

FIG. 10 shows another perspective view of the preferred platform of FIG. 9;

FIG. 11 shows a perspective view of a stairs arrangement that may be used with the lift device of FIG. 1;

FIG. 12 shows a perspective view of a retractable side wheel mount that may be used with the lift device of FIG. 1;

FIG. 13 shows an overhead plan view of two lift devices according to the invention positioned for use adjacent aircraft doorways.

DETAILED DESCRIPTION OF THE DRAWINGS

Figure 1:
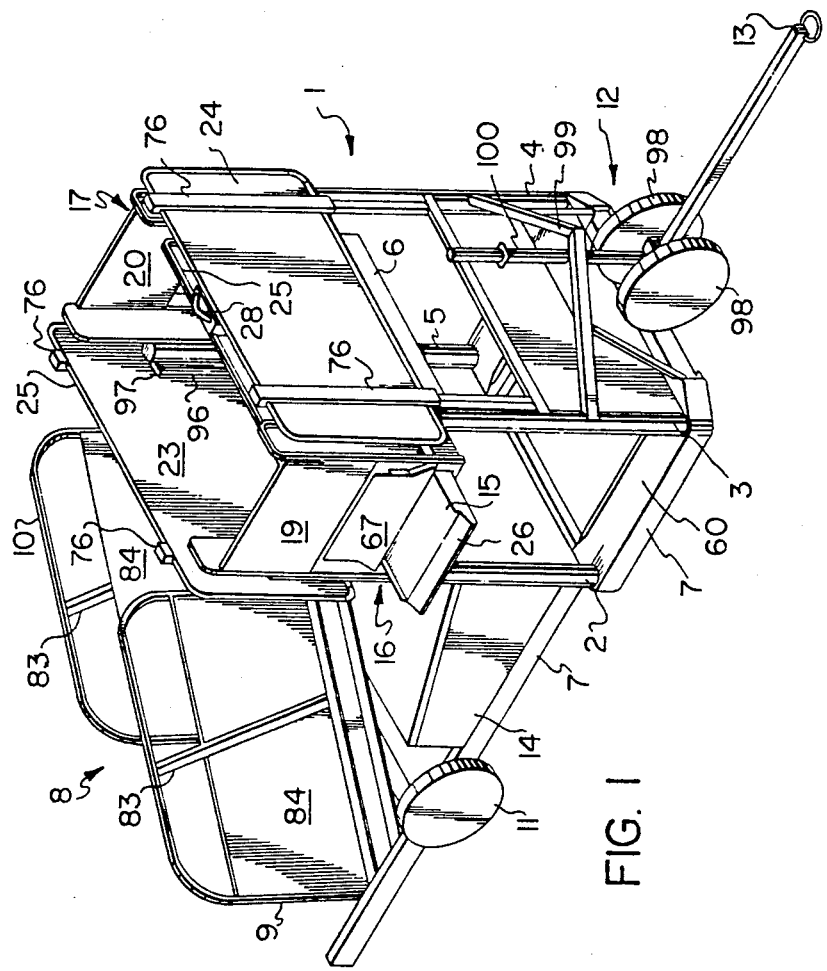
FIG. 1 shows a perspective view of one embodiment of the lift device of the invention.

FIG. 1 shows one preferred version of the lift device of the invention. The lift device comprises generally a platform lift section 1 preferably having four corner upright guides 2, 3, 4 and 5 for a vertically moveable platform 6 extending over a base 7 (or chassis) of the lift device. The platform 6 is shown in FIG. 1 in an elevated position. The lift device also preferably comprises a flight of stairs 8 with hand rails 9, 10. The base 7 preferably has attached two side wheels 11 (one not visible in FIG. 1) and one pivotable nose wheel assembly 12, preferably including two wheels 98, and all of the wheels may be fully retractable. When the wheels are in a fully retracted position, the base 7 rests on the ground providing stability for the lift device when in use. A tow bar 13 is provided for attachment to a tow vehicle (not shown) for moving the device to and from aircraft. Optionally the nose wheel may be driveable to assist manoeuvering of the vehicle when close to an aircraft. Otherwise it may be so manoeuvred by hand. Housing 14 accommodates batteries and motor for driving the platform 6 vertically and optional battery charger, electric powered hydraulic pump and hydraulic cylinder for raising and lowering side wheels. The batteries also may provide power for other operable parts of the lift device, such as a retractable apron for assisting movement on or off the platform 6, or driveable nose wheels 98. The platform 6 preferably has a single retractable apron 15 for supporting the movement of persons in wheelchairs or non-disabled persons onto or off of the platform 6 either at ground or aircraft door-sill level. The apron 15 is extendable from the platform 6 from either of ends 16 and 17 of the platform 6. This facilitates loading a wheelchair onto the platform 6 at one end (16 or 17), for example in a forward direction and, when the platform has moved to a different level, unloading the wheelchair off of the platform 6 at the other end, also in a forward direction. This is a feature of convenience to those moving wheelchairs in that tricky, backing-up manoeuvres can be avoided.

FIG. 13 shows how the lift device of the invention preferably is positioned adjacent a commuter aircraft for enplaning and deplaning passengers. It can be seen that the stairs 8 and apron 15 are at right angles, which arrangement allows for convenient sharing of the apron 15 and platform 6 by passengers in wheelchairs and non-disabled passengers. Such arrangement also allows for safe enplaning and deplaning in either front-door or rear-door use, in that all passengers are kept away from the wing and propeller. In FIG. 13 the aprons 15 are shown extended both to the aircraft doorways and the ground, although in use only one such extension at a time can be accommodated in the preferred embodiment of the invention.

Figure 2:
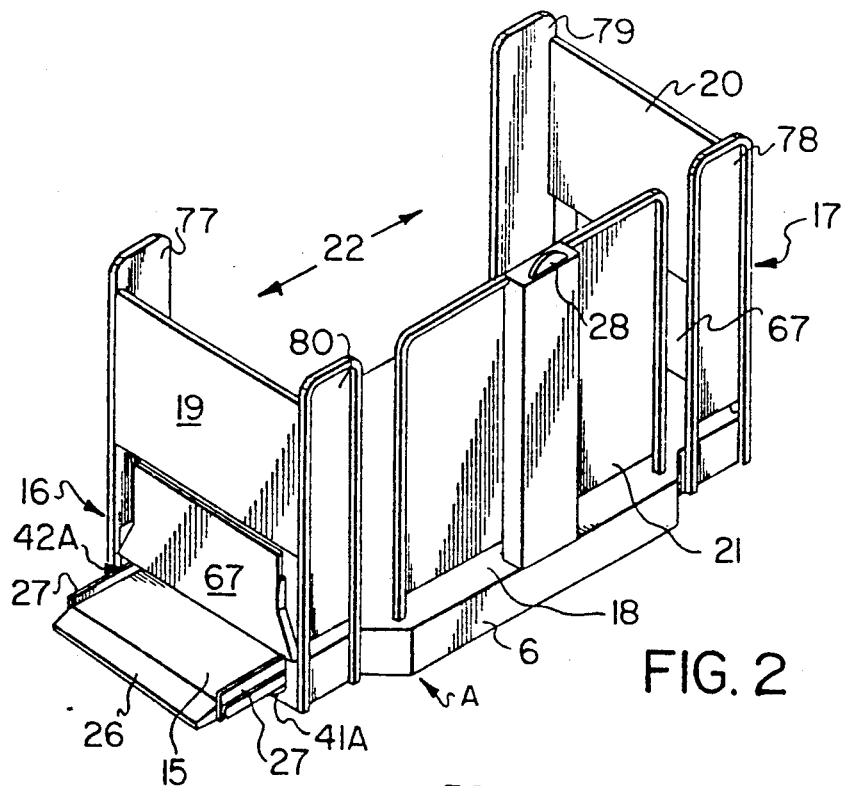
FIG. 2 shows a perspective view of the lift platform of the lift device of FIG. 1.

In FIG. 2 the platform 6 is shown to have a flat deck 18, openable end gates 19, 20 and a side barrier 21. As shown in FIGS. 9 and 10, preferably the openable end gates 19, 20 are each configured as telescoping door 70. Each door 70 preferably comprises a pivot shaft 71, panel 73 and positive positioning tab 72. The positive positioning tab 72 can hold the door 70 in a closed position across the end (16 or 17) of the platform 6. The door 70 is opened from a closed position as shown in FIG. 10 by first lifting the door 70 up with its pivot shaft 71, thereby disengaging the pivot shaft 71 from a notch of the positive positioning tab 72 so that the door 70 can then be rotated about its pivot shaft 71, about 90 degrees, to an open position (as shown in FIG. 9), whereupon the door 70 can then be lowered with its pivot shaft 71 to engage another notch of the positive positioning tab 72 and thereby be kept in the open position. These steps can be reversed in order to close each door.

The door 70 preferably has a telescoping feature for added safety and convenience. When the door 70 is open, panel 73 can be extended along guides 75 in a direction in parallel with the direction of extension of apron 15 to provide a barrier and handrail for the safety of passengers moving along the apron 15 to or from an aircraft.

In the embodiment of the invention shown in FIGS. 1 and 2, the end gates 19 and 20 may be non-telescoping doors hinged to adjacent support panels 76 or 77 and 78 or 79 respectively. In such case, and in particular where such gates are not suitable for functioning as a barrier and handrail when open as in telescoping door 70, it may be advantageous to provide panels 23, 24 slideably mounted on supports 76 and/or guide rails (not shown). Panels 23, 24 are slideable in either direction of extension of apron 15 so that when apron 15 is in use at an elevated position adjacent an aircraft doorway, such panels may act as barriers and provide handrails for the safety of persons moving along the apron 15. Optionally only one of panels 23, 24 may be provided. The panels 23, 24 are secured to the platform 6 such that they move with the platform 6 during vertical motion.

In FIGS. 2, 9 and 10, space 22 is shown which allows walking passengers to move between the platform 6 and stairs 8 enroute to or from the aircraft. The space 22 would be spanned by the panel 23, if used, during vertical movement of the platform 6 or during towing and storage of the lift device. End gates 19, 20, barrier 21, supports 77, 78, 79, 80 and panel 23 when used, substantially enclose the platform 6 at its perimeter during vertical motion of the platform 6. The top edges 25 of such gates, barrier, supports and panel may act as handrails. The flat deck 18 of the platform 6, the deck of apron 15 and the steps of stairs 8 may be provided with an anti-skid surface.

Below each gate 19, 20 there is preferably provided a transition flap 67. Such flap is hinged to the edge of the platform 6 at each end 16, 17 thereof. In FIGS. 1, 2 and 10 the transition flap 67 is shown in a vertical position when, for example, the platform 6 is in motion. When the platform 6 is in a position for loading or unloading passengers, the transition flap is in a lowered position as in FIG. 9, in contact with the deck of apron 15 so as to provide a smooth, gradient transition, suitable for wheelchair movement between the level of the flat deck 18 of the platform 6 and the lower level of the deck of apron 15. The transition flaps 67 may be spring-loaded to hold the same in either a vertical or lowered position, as desired.

The single retractable apron 15 is slideably mounted under the flat deck 18 of the platform in channel side openings 41, 42. Wedge-shaped rubber ends 26 are provided on each extremity of the apron 15, so that when either of such ends 26 is in contact with an aircraft, damage to the aircraft from rubbing, scraping or bumping is prevented, for instance during movement of the aircraft while passengers enplane or deplane. The apron 15 preferably also has raised side panels Z7 which prevent wheelchair wheels from rolling off the apron 15 at sides thereof when wheelchairs are moved along the apron 15.

Figure 3:
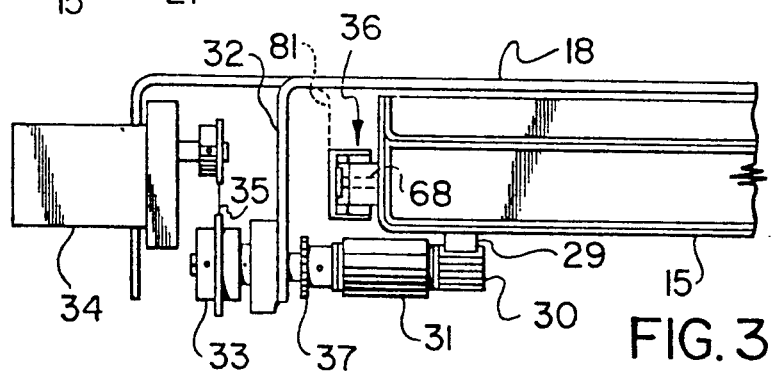
FIG. 3 shows a cross-sectional view of another embodiment of the lift platform of the lift device of FIG. 1, an apron mounted under the platform and a mechanism to drive the apron.
Figure 4:
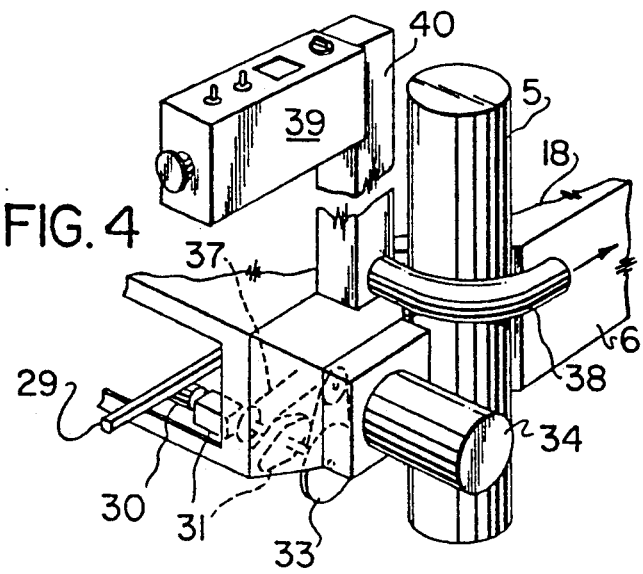
FIG. 4 shows a perspective, part transparent view of one corner of the platform shown in FIG. 3.

FIGS. 3 and 4 show a preferred arrangement for controlling movement of the apron 15. The apron 15 is slideably mounted to the underside of platform 6 preferably on nylon slides 36 adjacent each side of the apron 15 (only one of the nylon slides 36 is shown in FIG. 3). Attached along most of the length of the underside of the apron 15 is a rack 29 engaged with a pinion 30 in turn connected through a bearing block 31 and mounting supports, for attachment to a flange 32 of the underside of the platform 6 near one end 16 or 17 thereof, to a torque limiter 33. The torque limiter 33 is driveably connected to the gear motor 34 by a roller chain 35. A second roller chain 37 is arranged to driveably connect with a second pinion (not shown) mounted near the other end of the underside of the platform 6, which second pinion also engages the rack 29. Wires 38, shown in FIG. 4 curving around an upright guide 5, connect electrical control panel 39 to a power source, e.g. batteries in housing 14. Other wires (not shown) connect the control panel 39 to the electric gear motor 34. The control panel 39 can be mounted at the top of support 40 extending from the deck 18 up to a height convenient for operation by a standing operator. Preferably, the control panel 39 and support 40 are located near an end 16 or 17 of the platform 6, and a duplicate of control panel 39 and support 40 are provided near the other end of platform 6.

When it is desired that the apron 15 be extended to meet an aircraft doorway, an operator activates a power switch on the control panel 39, preferably a spring-return toggle switch in the direction in which the apron 15 is desired to be moved. Power is then supplied to the electric gear motor 34 which turns the roller chain 35 to drive the torque limiter 33, the roller chain 37 and pinions 30. Turning of the pinions 30 moves the rack 29 and attached apron 15 until the operator deactivates the power switch or the apron 15 reaches a positive stop mounted on each end of the underside of platform 6. The use of positive stops prevents overtravel of the apron 15. When a positive stop is encountered, further extension of the apron 15 is halted, the torque limiter 33 begins slipping and thereby prevents damage to the gear motor 34. Also, if the apron 15 accidentally rams into an aircraft during extension to reach the doorway of the aircraft, the torque limiter will slip as it would if the apron 15 had encountered a positive stop, thereby stopping further extension of the apron 15 and consequently preventing damage to the aircraft.

The apron 15 preferably maintains a generally level (i.e., horizontal) to modestly inclined plane, that is inclined downwardly from the level of the platform 6, at various extension positions of the apron 15 preferably by means of mounting in the pair of parallel, nylon slides 36, which are U-shaped in cross-section and firmly attached along flanges 81 of the underside of the platform 6. Into each of the nylon slides 36 slideably fits a nylon runner 68 secured respectively along each side of the apron 15. Preferably, some vertical clearance is provided for the nylon runners 68 within the slides 36, more so towards the ends of the slides 36, so that as the apron 15 is extended it acquires an incline which is at its greatest when the apron 15 is fully extended; increased vertical clearance towards ends of the slides 36 may be provided by using slides 36 having vertically wider U-shaped cross-sections towards their ends, or more preferably by using runners 68 which are tapered towards their ends.

The preferred embodiment of the lift device of the invention allows the platform 6 to be lowered to a level close to the ground. At its lowest position, the deck 18 is about 7 inches off the ground. Such a low level is attained by means of the retractable wheels 11 and wheel assembly 12, which allow the base 7 to be lowered to rest on the ground, and location supports for the platform 6, in the preferred embodiment namely acme screws 41 within upright guides 2, 3, 4 and 5, at or outside the perimeter of the platform 6 rather than underneath the platform 6. Nevertheless, in the preferred embodiment, the apron 15 is required as a ramp to provide a smooth transition for the movement of wheelchairs from the platform 6 to the ground and vice versa. When the apron 15 is nearly fully extended in either of its directions of extension, only one of the pinions 30 is in contact with the rack 29, namely the one closest to the end of the platform 6 from which the apron 15 is extending. As well, the apron 15 is sufficiently extended as to be, with respect to its mounting in the nylon slides 36, tilted downwardly. Notwithstanding tilting of the apron 15 in this manner, contact between the said one of the pinions 30 and the rack is maintained. Thus, the apron 15 can be retracted from a tilted position extending downwardly to the ground (or aircraft door-sill) by operation of a switch on the control panel and consequential driving of the said one of the pinions 30.

Preferably, when preparing to extend the apron 15 to an aircraft doorway, the platform 6 is first positioned at a level higher than the aircraft door-sill level. The apron 15 is then extended until at least rubber end 26 reaches over the door-sill. The platform 6 is then lowered until rubber end 26 rests on the door-sill; a downward incline of the apron 15 from platform 6 to the door-sill may be maintained.

Although the arrangement for electrical operation of the apron 15 as shown in FIGS. 3 and 4 is preferred, manual mechanisms (not shown) for such control may also be used, for instance using a wheel, belt (or chain) and pulley system wherein the operator selectively turns a control wheel 28 (see FIG. 1) provided adjacent a handrail on the platform 6, which consequently, through pulley and belt connectors, turns pinions corresponding to pinions 30 acting on a rack, corresponding to race 29, beneath the apron 15 so as to move the same.

Although the single, retractable apron 15 and the control mechanisms for such apron described above are preferred means for providing access to and from the platform 6, alternative means, such as a drawbridge at each end 16 and 17 of the platform may be used. Such a drawbridge, which is hinged where it meets an end of the platform 6, may be moved from a vertical position to an approximately horizontal to modestly inclined position to facilitate movement of passengers over it from platform 6 to and from an aircraft or to and from the ground.

Figure 5A:
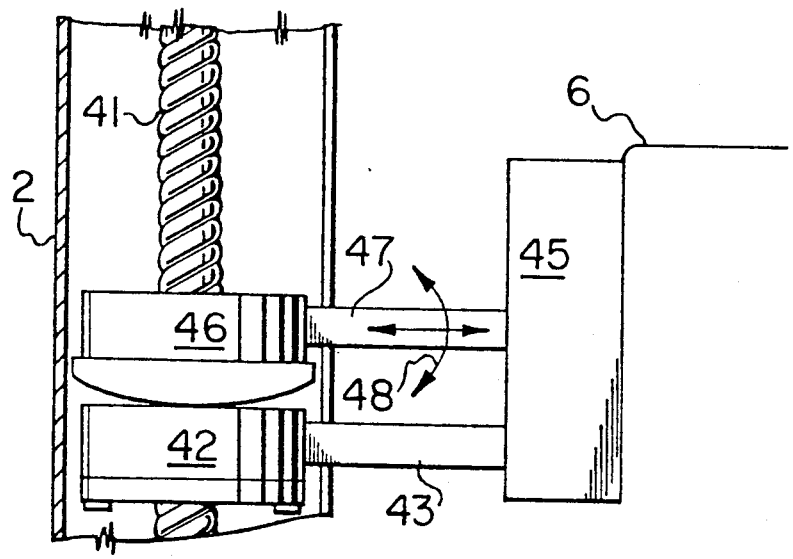
FIG. 5a shows a side view through a cut-away section of an upright guide where there are connections to the platform of the lift device of FIG. 1.
Figure 5B:
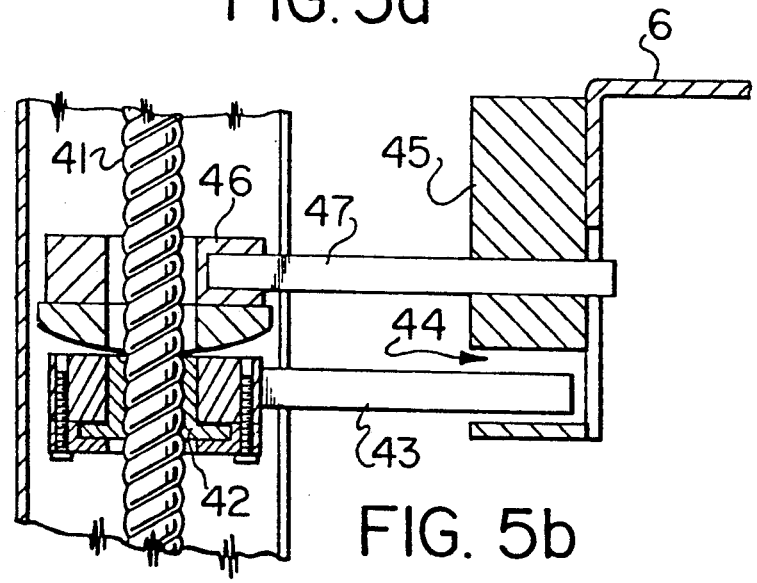

The preferred lifting mechanism for the platform 6 is shown in detail in FIGS. 5, 6. The platform 6 is mounted at each of its four corners onto an acme screw encased by an upright guide 2, 3, 4 or 5. A vertical slot runs the length of each upright guide, facing the platform 6 through which connections from the acme screw to the platform 6 extend. Referring to FIG. 5, the acme screw 41 is rotatable through nut 42 such that nut 42 may be raised or lowered along the length of the acme screw 41 as the screw 41 is turned. Locked onto the nut 41 is a stem 43 which projects into a slot 44 in a nylon block 45, bolted onto a side of platform 6 at 106 (see FIG. 9), which slot 44 provides clearance around and at the end of the stem 43 to accommodate small, e.g. preferably up to ½-inch, movements of the stem as the nut 41 is moved by selective turning of the screw 41. Resting on top of the nut 41 is nylon rocker 46 having a stem 47 firmly attached to it and extending laterally through the vertical slot of the upright guide into and preferably through nylon block 45 above the slot 44. Further preferably the stem 47 projects through nylon block 45 and through a hole or slot 107 (FIG. 9) in the side of platform 6 to which the nylon block 45 is bolted or otherwise attached at 106 (FIG. 9), which hole or slot is larger in diameter or width respectively than the diameter of the stem 47. The stem 47 is firmly in contact with the nylon block 45 especially since, in this preferred embodiment, the weight of the platform 6 is acting through the nylon block 45 onto the stem 47. If the stem 47 projects through a hole or slot 107 in the side of platform 6 as aforesaid, such side does not contact stem 47 in view of the aforementioned larger diameter of the hole; only the nylon block 45 is in contact with stem 47, thereby allowing for the platform 6 to slide on stem 47.

All of the weight of the platform 6 is thus distributed through its four corners proportionately to each acme screw via the nylon block 45, stem 47, nylon rocker 46 and nut 42. The nylon rocker 46 surrounds the acme screw 41 but is normally not in contact with the acme screw 41 by reason of the provision of a hole of larger diameter than the diameter of the acme screw through the center of the nylon rocker 46. This ensures that all of the weight of the platform that is transferred to the nylon rocker from the stem 47 is transferred vertically to the nut 42 and not directly from the nylon rocker 46 to the acme screw 41, e.g. even if the platform 6 tilts the stem 47 and the nylon rocker 46. The stem 47 may tilt (see arrows 48) by reason of one or more of several motions of the platform 6. Although it is ideal to achieve in the construction of the lift device, vertical, parallel alignment of all four acme screws in the upright guides 2, 3, 4, 5, so that the distances separating such acme screws from each other are identical from the bases to the tops of the acme screws, in practical terms there is some variation of such distances. Thus, as the platform 6 is raised or lowered, the slight variation in such distances causes the platform 6 to move slightly towards or away from a given acme screw, in a roughly horizontal plane. Passenger movement may also cause the platform 6 to move slightly up or down, or jiggle. These motions, as well as motions from the changing forces during starting and stopping vertical movement of the platform 6, can cause tilting of the stem 47.

The nylon rocker 46 is smaller in diameter than the inside diameter of the upright guide 2 so as to allow for rocking motion of the nylon rocker 46 in response to the aforementioned motions of the platform 6 without binding on the inside wall of upright guide 2. Nylon material is by its nature also less likely to bind; it is self-lubricating to some extent. In view of the aforementioned larger diameter hole in the nylon rocker 46, binding with the acme screw 46 is also prevented.

The platform 6, when mounted as described above, is "freefloating" in that only vertical loads are transmitted to the acme screws 41 via the nuts 42. The platform 6 is free to move in a horizontal plane within the constraints of the upright guides 2, 3, 4, 5.

The stem 43 is prevented, by contact with one or other side walls of the slot 44, from pivoting with attached nut 42 about the acme screw 41. This prevents the nut 42 from rotating as the acme screw 41 is selectively turned and results in the nut 42 either being raised or lowered on the acme screw 41. Vertical motion of the nut 42, occasioned by selective turning of the acme screw 41, in turn carries with it the nylon rocker 46 resting on its upper surface and, through the rigid connections of the nylon rocker to the stem 47, nylon block 45 and platform 6, the platform 6 as well. The aforementioned clearance in the slot 44 allows for tolerance of the above-described motions of the platform 6, without any resulting force being applied to the stem 43 or, consequentially, the nut 42, and thereby preserves smooth, non-binding motion of the acme screw through the nut 42 when the acme screw is selectively turned. Also, if downward motion of the platform 6 is obstructed and does not follow downward motion of the nut 42 when the acme screw 41 is selectively turned so as to effect a desired lowering of the platform 6, perhaps because the one of the nylon rockers 46 is stuck against a side wall of an upright guide 2, 3, 4 or 5 ice or dirt, the stem 43 will, preferably after only about ½-inch of downward movement of the nut 42, contact the bottom of the slot 44 and itself push downwards on the nylon block, in most cases so as to free the nylon rocker 46, or other obstructed attachment to the platform 6, from the obstruction. This self-unsticking capability would return downward movement to the platform at the previously obstructed area as the nut 42 continues to descend.

The acme screws in each of the upright guides 2, 3, 4, 5 are synchronized for simultaneous turning so that the corners of the platform 6 will be raised or lowered simultaneously; this preserves the horizontal, level plane of the platform 6 during raising and lowering of the platform 6.

Figure 6A:
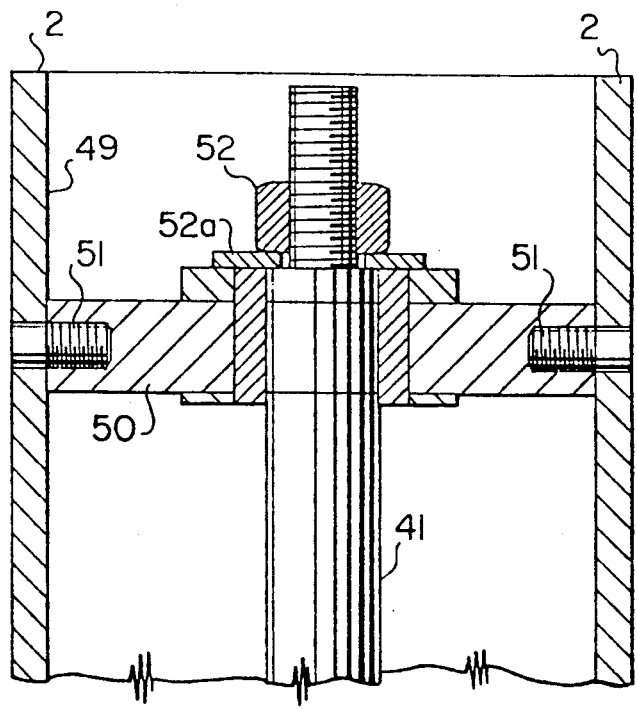
FIG. 6a shows a side, cross-sectional view of a top area of the upright guide of FIG. 5a, where an upper end of an acme screw is mounted.
Figure 6B:
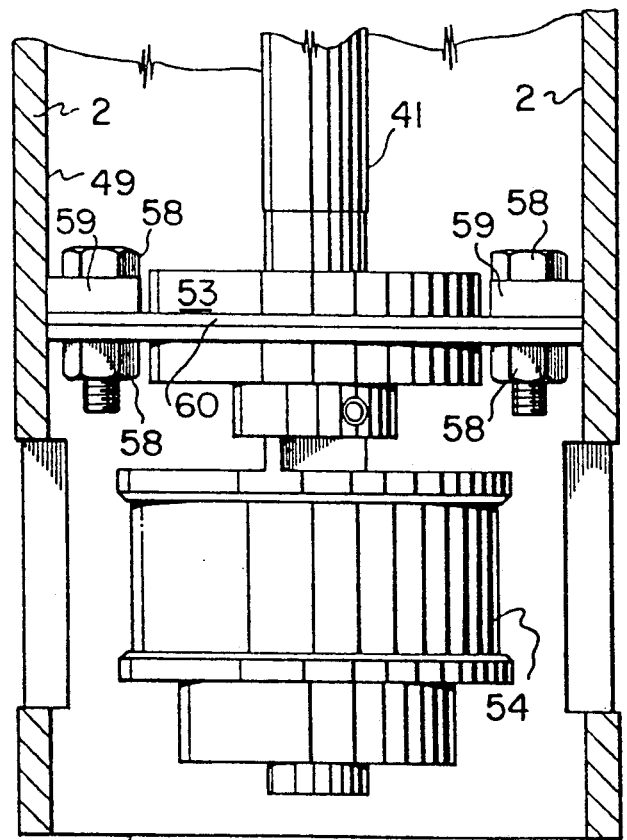
FIG. 6b shows a side, cross-sectional view of a bottom area of the upright guide of FIG. 5a, where a lower end of an acme screw is mounted.

FIGS. 6a and 6b show the preferred mounting arrangement of each acme screw 41 in upright guides 2, 3, 4 and 5. A top portion of the acme screw 41 is secured for bearing vertical loads while remaining rotatable via bearing 50, bearing mounts 51 to the inside wall 49 of the upright guide 2, castle nut 52 and flat washer 52a. The bearing 50 should be able to bear at least ¼ of the gross platform weight in thrust, i.e. axial, not radial, loading. The acme screw 41 can turn in the bearing 50 when the acme screw 41 is selectively turned. Vertical loading on the acme screw 41 causes tension from where it is mounted above bearing 50 down the acme screw 41 to the point of loading.

At a bottom section of the acme screw 41, there is shown in FIG. 6b a preferred support of the acme screw 41 in relation to the inside wall of upright guide 2 incorporating self-aligning bearing 53. The acme screw preferably is slideably fitted through the bearing 53 and is not also mounted so as to bear compression loading. The usually slender acme screw 41 may buckle under compression loading, causing platform support failure. It is preferred that the acme screw 41 be hung from the said top portion accordingly. The acme screw 41 is connected to a gear pulley 54 in an area 55 beneath the bottom of the upright guide 2, such that when the gear pulley 54 is selectively turned by a belt (not shown in FIG. 6b but see the toothed belt 61 in FIG. 8) the acme screw 41 is also turned. The gear pulley 54 may be provided with ribs for engaging a toothed belt, or with sprockets for engaging a chain, rather than a belt.

It is noteworthy that there is sufficient friction between the acme screw 41 and the nut 42 that when the acme screw 41 is not selectively turning at the instance of an operator, the nut 42 will not, despite the force of the weight of even a fully loaded platform acting upon it from above, itself force the acme screw to turn and cause descent of the nut 42 and the platform 6 with it. Thus, when the platform 6 is not being vertically moved to raise or lower passengers, for instance when it is stationary at a level allowing passengers in wheelchairs to be wheeled onto or off of an aircraft, the platform 6 will not, even slowly, descend; no safety stop preventing unwanted descent is required.

In an alternative embodiment, a ball bearing screw, such as the kind supplied by the Warner Electric Brake and Clutch Company of Troy, Mich., U.S.A., may be used in place of each acme screw 41. The nut mounted on a ball bearing screw which corresponds to the nut 42 of the acme screw 41 rides smoothly and with far less friction than the latter over the ball bearing screw. However, friction is sufficiently low that the force of the weight of the platform 6 acting on the nut on a ball bearing screw may cause the ball bearing screw to turn and, consequently, the nut on such screw and platform 6 to descend. Thus, when the platform 6 is at a desired level, a stop must be provided to prevent unwanted possible descent of the platform 6. Use of the acme screw 41 eliminates the need for such a stop and, in view of its lower cost, is presently preferred over the ball bearing screw.

Each upright guide 2, 3, 4 and 5 is mounted on base 7, preferably at locations shown in FIG. 1. In FIG. 7, braces 56 and 57, for supporting vertical alignment of a pair of adjacent upright guides are clearly shown. Each upright guide 2, 3, 4 and 5 may be mounted on the base 7 as shown in FIG. 6b. Conventional nuts and bolts 58 secure part 59 of the base of the upright guide to plate 60 over part of the base 7. The gear pulley 54 is thus under plate 60 of the base 7.

Engaged around part of each gear pulley 54 is a belt, toothed (or timing) belt or chain (61 in FIG. 8), which runs within a space, best shown in FIG. 7, bordered by base members 62 and beneath plates 60 (overlying further base members perpendicular to base members 62). The belt or chain 61 also engages a main drive pulley 63 (see FIG. 8), and may also engage adjustable tensioner pulleys 64 and fixed tensioner pulleys 65. The belt or chain 61 projects through a hole (not shown) in the base member 62 closest to the stairs 8 in order to engage the main drive pulley or sprocket 63. The main drive pulley or sprocket 63 is attached to a motor and gearbox 66 which is covered by housing 14. When an operator actuates the motor, the main drive pulley or sprocket turns, thereby moving the engaged belt or chain 61 and, consequentially, each gear pulley or sprocket 54 and the acme screw 41 to which it is attached, in a synchronous manner. The main drive pulley or sprocket can be turned selectively clockwise or counter-clockwise, thereby moving the engaged belt or chain 61 and acme screws 41 clockwise or counter-clockwise respectively to move the platform 6 upwards or downwards respectively if the acme screws 41 have right-hand threads.

Operation of the motor driving the ascent or descent of platform 6 preferably is controlled by a switch on control module 39 and on the aforementioned duplicate of control module 39. A manually operable crank attached to a shaft, in turn connected to the gearbox, may be provided in the lift device to allow for manual override of the electrically driven system in the event of, for example, a failure of the power supply.

The preferred embodiment of the lift device of the invention includes adjustable flight of stairs 8 comprising (referring to FIG. 11) parallelogram stringers 90 running on wheels 91 in guide channels 92, thus providing level steps 93 at different positions of extension and contraction of the flight of stairs 8. The bottom step thus mainly moves along the direction marked "a" (in FIG. 11) and the top step mainly moves up and down in the direction marked "b", as the stairs 8 are moved in relation to vertical movement of the platform 6. The hand rails 9, 10 (FIG. 1) may be supported by braces 83 and may include panels 84.

When the platform 6 is at its lowest level, the flight of stairs 8 rests in its most contracted position, in which the underside of the top-most step may be in contact with brace 56 between upright guides 2, 5 (see FIG. 7). As the platform 6 ascends and reaches the level of the top-most step, hooks 94 attached to the side of the platform 6 contact the underside of the top-most step. As the platform 6 ascends further, the hooks lift the top-most step with it, preferably always maintaining the level of the top-most step flush with the level of the deck 18. As the top-most step is lifted, of course the flight of steps 8 simultaneously moves, drawing the wheels 91 along guide channels 92 towards the base member 62.

The flight of stairs 8 preferably includes paired opposed sleeves 95 secured to the lateral edges of the top-most step, which slideably enclose upright rods 96 attached at their upper ends to cross pieces 97 in turn secured to upright guides 2, 5, and at their lower ends to brace 56. The upright rods 96 secure the topmost step from lateral, forwards and backwards motions during ascent and descent when moved by the platform 6.

The nose wheel assembly 12 preferably includes a hydraulic cylinder 100 for hydraulically lowering and raising the base 7 where the nose wheel assembly contacts forward support structure 99 of the base 7. The forward-most and lower-most part of the base 7 contacts the ground when the hydraulic cylinder is appropriately activated. Side wheels 11 preferably also include a hydraulic cylinder(s) for lowering or raising the sides of the base 7 to which the side wheels 11 are respectively attached. Thus, when the base 7 is sufficiently lowered hydraulically at its side wheels 11 and nose wheel assembly 12, it can completely rest on the ground, providing stability for use in enplaning and deplaning passengers. Optionally casters may be provided on the underside of base 7 to facilitate further positioning of the lift device once all wheels have been retracted. The side wheels 11 can alternatively include a cranking mechanism for manual control of lowering and raising the base 7 onto and above the ground in conjunction with the hydraulically controlled motion at the nose wheel assembly. FIG. 12 shows a side wheel crank stub axle 101 including crank arm 102, lever 103 and actuator 104, mounted onto a top of side member 105 of base 7 (which also provides a stair wheel guide channel 92). On actuation, lever 103 rotates as indicated by the arrow to raise crank arm 102, stub axle 101 and the attached side wheel (not shown). The "raising" of the side wheel effects a lowering of the base 7.

The preferred mechanism disclosed herein for the raising and lowering of the platform 6, namely that incorporating driveable acme screws or ball screws adjacent the perimeter of the platform, can be substituted by other mechanisms such as driveable (e.g. by chain, belt or shaft) or hydraulic scissors, or telescoping hydraulic cylinder lifts, preferably connected and located to one or more sides of the platform 6. Under-the-platform scissors or telescoping hydraulic cylinder lift mechanisms can be expected to be too bulky and prevent sufficient lowering of the platform 6 to the ground accordingly. However, if such are disposed to a side of the platform, this disadvantage would be eliminated. The preferred mechanism of the invention presently offers significant cost advantages over scissors or telescoping hydraulic cylinder forms of lift mechanisms.

The preferred feature of raising and lowering the base 7 from and to the ground for stability of the lift device during use by means of retractable wheels may be substituted by a plurality of hydraulically driven retractable stabilizer arms which are mounted on the base and able to extend onto the ground to take up at least some of the weight of the lift device from the wheels, in the event lowering of the base 7 to the ground should offer no or little advantage in particular uses of the lift device or in larger sized versions of the lift device.

Although this invention is described in terms of specific embodiments, it is not limited thereto, as would be understood by those skilled in the art, and numerous variations are possible within the scope of the invention without departing from the scope and nature thereof.

We claim:

1. A lift for loading and unloading able persons and disabled persons in wheelchairs onto and off of a commuter aircraft, comprising in combination a base, platform, means mounted on the base for vertically moving said platform substantially perpendicularly, with respect to ground between positions adjacent the ground and a doorway of the commuter aircraft, and stairs; said platform including an apron mounted thereon and adapted to allow said able persons and disabled persons to be loaded from the platform onto the commuter aircraft, or unloaded from the commuter aircraft onto the platform, and further adapted to allow said able persons and disabled persons to be loaded from the ground to the platform, or unloaded from the platform to the ground; said stairs having an upper section mounted on or adjacent a side of the platform when the platform is between a first upper level of the platform and a second upper level of the platform but is not so mounted when the platform is below said first upper level, the stairs being extendible between the said first upper level and the said second upper level, and when the lift is in use, the stairs being substantially in parallel alignment with the fuselage of the commuter aircraft, whereby able persons may use such lift as stair access to or from the platform when the platform is adjacent the commuter aircraft doorway; said means mounted on the base comprising: a movable means supported by the base and engaging a platform support means, the platform support means engaging the platform; and a drive means engaging the movable means selectively to drive the movable means, whereby when the drive means is activated, the platform can be selectively raised or lowered.

2. The lift of claim 1, wherein said apron comprises first and second drawbridge ramps hingeably mounted to or adjacent sides of said platform.

3. The lift of claim 2, wherein said first and second drawbridge ramps are hinged respectively to opposite sides of the platform.

4. The lift of claim 1, wherein said apron is a single apron slideably mounted beneath said platform.

5. The lift of claim 1, wherein said base is mounted on a chassis having wheels.

6. The lift of claim 5, wherein said base forms the lowest part of said chassis.

7. The lift of claim 5, wherein said wheels are retractable, whereby said base can be lowered into ground contact.

8. The lift of claim 1, wherein the apron comprises first and second aprons slideably mounted beneath said platform.

9. The lift of claim 1, wherein said platform support means comprises support brackets, each support bracket comprising a bushing engaging said movable means, said movable means being a substantially vertical ball screw, said ball screw being rotatably journalled in upper and lower brackets mounted on substantially vertical upright support means mounted on said base, an actuator engaging a base of said ball screw, the actuator drivably connected to a motor.

10. The lift of claim 9, wherein said actuator is a wheel adapted for belt drive.

11. The lift of claim 9, wherein said bushing is a ball nut.

12. The lift of claim 9, wherein the bushing is a nut, each support bracket additionally comprises rocker means on an upper surface of the nut to transfer weight of the platform vertically onto the nut during horizontal vibration movements of the platform that may be occasioned when the lift is in use, and the ball screw is mounted to receive loads from the platform via the platform support means in tension.

13. The lift of claim 1, wherein said movable means is contained within a plurality of upright members mounted on said base, and the stairs are aligned between two of said upright members.

* * * * *